(12) United States Patent
Tomisawa et al.

(10) Patent No.: US 8,243,125 B2
(45) Date of Patent: Aug. 14, 2012

(54) IMAGE DISPLAY DEVICE

(75) Inventors: Isao Tomisawa, Saitama (JP); Masaru Ishikawa, Saitama (JP); Katsumi Unehara, Saitama (JP)

(73) Assignee: Pioneer Corporation, Tokyo (JP)

( * ) Notice: Subject to any disclaimer, the term of this patent is extended or adjusted under 35 U.S.C. 154(b) by 1157 days.

(21) Appl. No.: 11/996,630

(22) PCT Filed: May 26, 2006

(86) PCT No.: PCT/JP2006/310557
§ 371 (c)(1),
(2), (4) Date: Apr. 14, 2008

(87) PCT Pub. No.: WO2007/013215
PCT Pub. Date: Feb. 1, 2007

(65) Prior Publication Data
US 2010/0283838 A1  Nov. 11, 2010

(30) Foreign Application Priority Data
Jul. 25, 2005 (JP) .................... 2005-213549

(51) Int. Cl.
*H04N 13/04* (2006.01)
(52) U.S. Cl. .......................... 348/51; 348/54
(58) Field of Classification Search .............. None
See application file for complete search history.

(56) References Cited

U.S. PATENT DOCUMENTS 6,008,484 A * 12/1999 Woodgate et al. ......... 250/201.1
7,839,430 B2 * 11/2010 Hentschke ...................... 348/59
2001/0022562 A1 * 9/2001 Ishikawa ............................ 345/9
2004/0233275 A1 * 11/2004 Tomita ............................. 348/51
2005/0122584 A1   6/2005 Ishikawa et al.
2005/0122585 A1 * 6/2005 Tomisawa et al. ............ 359/472

FOREIGN PATENT DOCUMENTS

| JP | 6-348404 A | 12/1994 |
| JP | 9-16312 A | 1/1997 |
| JP | 09-055152 A | 2/1997 |
| JP | 11-067030 A | 3/1999 |
| JP | 2005-141102 A | 6/2005 |

OTHER PUBLICATIONS

International Search Report of PCT/JP2006/310557 filed May 26, 2006, date of mailing Jul. 18, 2006.

* cited by examiner

*Primary Examiner* — John B. Walsh
(74) *Attorney, Agent, or Firm* — Young & Thompson

(57) ABSTRACT

An image display device capable of detecting an object in a space where a 3D visualized image is formed without feeling the existence of a mechanism for position detection. The image display device includes: display unit (11) for displaying a 2D image (1); an optical panel (12) arranged in front of an image display plane (15*a*) of the display unit (11) and forming a 3D visualized image (2) based on the 2D image (1) in a forward space (3) spreading in front of the optical panel (12); recognition unit arranged behind the optical panel (12) for optically recognizing the an object (5) coming into the forward space (3) via the optical panel (12); and position detection elements (14) for detecting the coming position of the object (5) into the forward space (3) according to the recognition result by the recognition unit.

18 Claims, 9 Drawing Sheets

IMAGE DISPLAY DEVICE

TECHNICAL FIELD

The present invention relates to an image display device that detects an approach position of a detected object that has entered a space from the outside, the space having therein a three-dimensionally viewable image formed on the basis of a two-dimensional image.

BACKGROUND ART

In recent years, an image display device has been proposed that includes displaying means (display unit) for displaying a two-dimensional image, and an optical panel (image transmitting panel) arranged in front of an image formation plane of the displaying means, for forming a real image of the two-dimensional image in a front space of the optical panel, to allow a two-dimensional image to be three-dimensionally viewed by a viewer located in front of the front space. Also, it has been conceived that frame-like recognizing means (position detecting sensor) is provided to surround the four sides of the front space, to detect an approach position of a detected object (finger of the viewer, or the like) that has entered the front space (for example, see Patent Document 1).

Patent Document 1: Japanese Unexamined Patent Application Publication No. 2005-141102

DISCLOSURE OF INVENTION

Problems to be Solved by the Invention

However, in such an image display device, since the recognizing means is provided in front of the optical panel, the entire device may become large, and may cause the viewer to feel the presence of the mechanism. Hence, it is possible to give a surprise and an excitement to the viewer sufficiently.

An object of the present invention is to provide an image display device capable of detecting a detected object in a space having a three-dimensionally viewable image formed therein, without a viewer feeling the presence of a mechanism for position detection.

Means for Solving the Problems

An image display device of the present invention includes displaying means for displaying a two-dimensional image, an optical panel arranged in front of an image display plane of the displaying means, for forming a three-dimensionally viewable image in a front space of the optical panel on the basis of the two-dimensional image, recognizing means arranged behind the optical panel, for optically recognizing a detected object that has entered the front space, through the optical panel, and position detecting means for detecting an approach position of the detected object in the front space on the basis of a recognition result of the recognizing means, and the recognizing means includes an area sensor which captures an image in the front space through the optical panel and the position detecting means detects the approach position of the detected object on the basis of a captured image acquired into the area sensor.

With this configuration, the recognizing means can optically recognize the detected object that has entered the front space, through the optical panel, and the position detecting means can detect the approach position of the detected object in the front space on the basis of the recognition result. Also, since the recognizing means is arranged behind the optical panel, only the three-dimentionally viewable image is present between the optical panel and the viewer, the viewer does not feel the presence of the mechanism for the position detection, and the entire device can be compact.

It is noted that the approach position of the detected object is a concept containing a moving position variable with time in the front space of the detected object that has entered the front space.

In addition, the three-dimensionally viewable image may be a real image or a virtual image. Hence, other system may be employed. For example, a system that forms a real image of a two-dimensional image to be three-dimensionally viewed, such as a convex lens array (described later), or a system that allows a real image to be three-dimensionally viewed, such as an integral photography system, may be employed. Alternatively, a system that a virtual image is three-dimensionally viewed using binocular parallax, may be employed, through application of, for example, a parallax barrier system, or a lenticular system. Also, by recognizing the position of the detected object by a pixel of the acquired captured image, the approach position of the detected object can be accurately detected.

Another image display device of the present invention includes displaying means for displaying a two-dimensional image, an optical panel arranged in front of an image display plane of the displaying means, for forming a three-dimensionally viewable image in a front space of the optical panel on the basis of the two-dimensional image, recognizing means for recognizing reflected light that image light of the two-dimensional image is reflected by a detected object that has entered the front space, and position detecting means for detecting an approach position of the detected object in the front space, on the basis of a recognition result of the recognizing means.

With this configuration, the recognizing means recognizes the reflected light that the image light of the two-dimensional image is reflected by the detected object. Accordingly, the number of factors for determining the approach position of the detected object in the front space can be increased, in association with the displayed two-dimensional image. Hence, the accuracy of the position detection can be increased. Also, the cost can be decreased because a light-emitting element for detection does not have to be additionally provided.

In this case, the recognizing means may preferably recognize reflected light that image light of the two-dimensional image is reflected by the detected object, and the position detecting means may preferably detect the approach position of the detected object on the basis of the reflected light and a display position of the two-dimensional image.

With this configuration, the recognizing means recognizes the reflected light that the image light of the two-dimensional image is reflected by the detected object, to optically recognize the detected object that has entered the front space. Accordingly, the position in the front space corresponding to the display position of the two-dimensional image can be detected as the approach position of the detected object. For example, when a two-dimensional image is displayed on the left side of the image display plane, if the detected object comes into the position (for example, left side) in the front space corresponding to the display position, image light of the two-dimensional image is reflected by the detected object, and the recognizing means recognizes the reflected light. In contrast, even if the detected object comes into a position deviated from the above-mentioned position, the recognizing means does not recognize reflected light. Accordingly, if the reflected light of the image light of the two-dimensional image is recognized, the position in the front space corresponding to the display position of the two-dimensional image can be detected as the approach position of the detected object. Thus, the approach position of the detected object can be detected in association with the display position of the two-dimensional image, thereby increasing the accuracy of the position detection.

In this case, the displaying means may preferably display a plurality of the two-dimensional images with different colors, the recognizing means may preferably recognize the color of the reflected light, and the position detecting means may preferably detect the approach position of the detected object on the basis of the color of the reflected light and the display position of the two-dimensional image.

With this configuration, the position in the front space corresponding to the display position of the two-dimensional image having the recognized color can be detected as the approach position of the detected object. For example, when a red two-dimensional image is displayed on the right side of the image display plane, and a yellow two-dimensional image is displayed on the left side, if the recognizing means recognizes that reflected light is red, the position detecting means detects the position in the front space corresponding to the display position of the red two-dimensional image (for example, the right side) as the approach position of the detected object. Thus, the approach position of the detected object can be detected in association with the color of the two-dimensional image in addition to the display position of the two-dimensional image, thereby further increasing the accuracy of the position detection.

It is noted that the plurality of two-dimensional images with different colors may be separated from each other, or continuously arranged.

In this case, the recognizing means may be preferably an area sensor for capturing an image in the front space through the optical panel, and the position detecting means may preferably detect the approach position of the detected object on the basis of a captured image acquired into the area sensor.

With this configuration, by recognizing the position of the detected object by a pixel of the acquired captured image, the approach position of the detected object can be accurately detected.

In this case, the displaying means may preferably contain the area sensor.

With this configuration, since the displaying means contains the area sensor, and these units are integrally provided, the entire device can be compact, as compared with those units separately provided.

In this case, the position detecting means may preferably detect a three-dimensional approach position of the detected object on the basis of a position of the detected object in the captured image, and a focus evaluation factor of the detected object at the captured image.

With this configuration, the approach position of the detected object in the image pickup plane in the front space is detected on the basis of the position of the detected object in the captured image, and the approach position (approach depth) of the detected object in the direction perpendicular to the image pickup plane in the front space (depth direction) is detected on the basis of the focus evaluation factor of the detected object at the captured image. Accordingly, the three-dimensional approach position of the detected object is detected. Thus, the approach position of the detected object can be precisely detected.

It is noted that the focus evaluation factor may include a focus state (edge), a change rate in size, a change in shape, or the like, of the detected object at the captured image.

In this case, the recognizing means may be preferably arranged at a position offset from the image display plane, and the device may preferably further includes light guiding means arranged between the image display plane and the optical panel, for guiding light from the image display plane to the optical panel, and for guiding light from the optical panel to the recognizing means.

With this configuration, since the recognizing means is arranged at the position offset from the image display plane, the design of the device can be desirably determined. Also, since the light guiding means guides the light from the optical panel to the recognizing means arranged at the position offset from the image display plane, the recognizing means can optically recognize the detected object through the optical panel.

In this case, a plurality of the recognizing means may be preferably provided corresponding to a plurality of virtually divided front spaces that the front space is vertically and/or horizontally divided with respect to the image display plane.

With this configuration, since the plurality of recognizing means are provided corresponding to the plurality of virtually divided front spaces, each recognizing means can be downsized. Also, if the plurality of recognizing means are arranged at positions offset from the image display plane, and the light guiding means such as half mirrors are arranged between the image display plane and the optical panel, the light guiding means can be downsized. Accordingly, the installation space between the image display plane and the optical panel can become small, thereby downsizing the entire device.

In this case, the device may preferably further includes collective means for collecting light from the optical panel to the recognizing means.

With this configuration, the recognizing means can be downsized, and can be desirably selected. Also, the layout design can be desirably determined.

In this case, the device may preferably further includes an image control unit for controlling the two-dimensional image on the basis of a control table, in which the detection result of the position detecting means is associated with a change in the two-dimensional image displayed on the image display plane.

With this configuration, the two-dimensional image displayed on the image display plane can be changed corresponding to the approach position of the detected object, such as finger of the viewer, thereby providing a user interactive function. Also, at this time, the viewer does not feel the presence of the mechanism for the position detection of the finger or the like, the viewer can get a surprise and an excitement, and can become curious.

In this case, the optical panel may be preferably constituted by a convex lens array, and the three-dimensionally viewable image may be preferably a real image of the two-dimensional image that is formed in the front space with the convex lens array.

With this configuration, the real image of the two-dimensional image can be formed in the front space. Also, since the image of the detected object that has entered the front space is formed at the recognizing means, the recognizing means can recognize the detected captured image as a normal image (picture). Hence, image processing would not be complicated. In addition, when the detected object is the finger of the viewer, or the like, the viewer can feel as if the viewer actually touches the real image, thereby enhancing the presence of the image.

Figure 1:
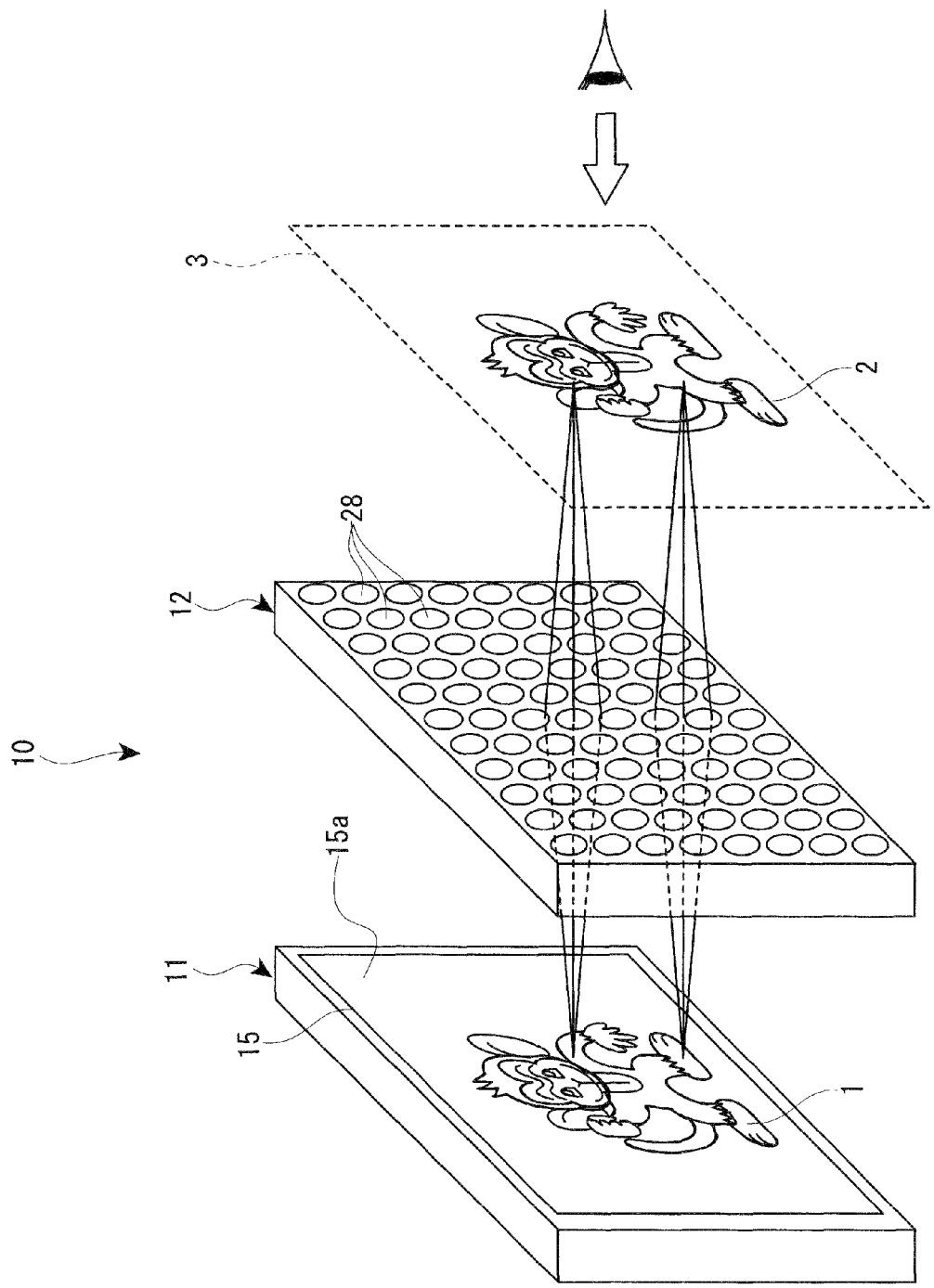
FIG. 1 is an illustration showing a basic configuration of an image display device with the present invention applied.

REFERENCE NUMERALS 1 two-dimensional image
2 real image
3 front space
5 detected object
10 image display device
11 display unit
12 lens array unit
14 controller
15a image display plane
16 area sensor
17 half mirror
18 collective lens

BEST MODE FOR CARRYING OUT THE INVENTION

An embodiment of an image display device with the present invention applied is described below with reference to the attached drawings. The image display device corresponds to three-dimensional display used for, for example, an amusement theater, a product-demonstration display, or a game machine. In particular, the device forms a two-dimensional image in a space, the two-dimensional image being displayed on an image display plane, to allow its real image to be viewed three-dimensionally. The device provides a user-interactive operation.

Figure 2:
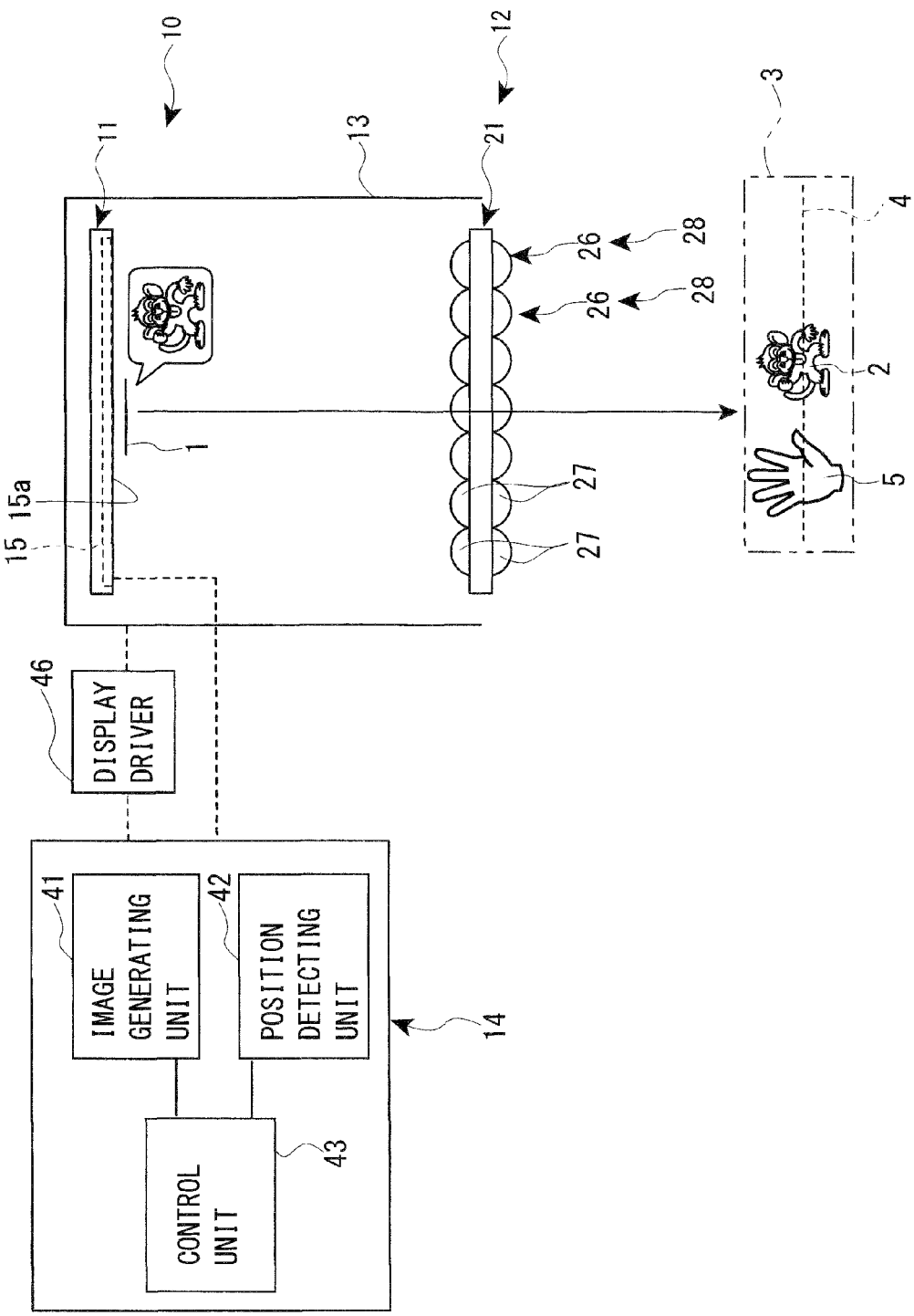
FIG. 2 is a block diagram showing an image display device according to an embodiment of the present invention.

As shown in FIGS. 1 and 2, an image display device 10 of this embodiment includes a display unit 11 that displays a two-dimensional image 1 (a movie or a still image) and has an image acquiring function, a lens array unit 12 (a convex lens array) that is arranged in front of the display unit 11 and forms a real image 2 (three-dimensionally viewable image) of the two-dimensional image 1 in a front space 3 extending in front of the lens array unit 12, a rectangular-parallelepiped case 13 that houses the display unit 11 and the lens array unit 12, and a controller 14 that supplies the display unit 11 with an image signal and detects an approach position of a detected object (for example, finger of the viewer) that has entered the front space 3.

The display unit 11 is constituted by, for example, a color liquid crystal display 15, and is an input display in which the display 15 contains an area sensor. In particular, the display 15 has, for example, 640×480 pixels. Though not shown, the display 15 has an array substrate in which display elements each composed of a signal line, a scanning line, and a pixel TFT arranged in a vertical and horizontal matrix, and a color filter, and the like, are superposed. A plurality of image pickup devices (photoelectric conversion elements or the like) are provided on the array substrate corresponding to the plurality of display elements. Accordingly, the display 15 can display the two-dimensional image 1 in color on an image display plane 15a thereof, and captures an incoming image with the area sensor contained therein. The display 15 may be a cathode-ray tube, a plasma display, an organic EL device, or the like, as necessary.

The display unit 11 thus configured displays the two-dimensional image 1 on the image display plane 15a on the basis of the image signal supplied from the controller 14 through a display driver 46. The two-dimensional image 1 is created with a three-dimensional image expression method by shading, perspectivism, etc., so that the real image 2 formed in the front space 3 can be three-dimensionally viewed.

In addition, the display unit 11 captures (recognizes) the image of a detected object 5 that has entered the front space 3, through the lens array unit 12, and outputs the captured data to the controller 14. The display unit 11, for example, sequentially reads light of three colors of red, blue, and green during capturing, and outputs the captured data of each color. Though described later in more detail, a captured image in color (image data) is generated on the basis of the input captured data of each color, whereby the color of the detected object 5 is recognized.

The lens array unit 12 has two plate-like lens arrays 21, and a lens frame (not shown) that integrally supports the lens arrays 21 in a superposed manner. The lens array unit 12 is provided substantially in parallel to the image display plane 15a of the display 15 so as to cover an opening formed in a surface of the case 13. In the drawing, the two plate-like lens arrays 21 are illustrated as an integral form.

Each of the plate-like lens arrays 21 has a plurality of convex lens elements 26 arranged in a plane with their optical axes located in parallel to each other. Each of the convex lens elements 26 has a pair of convex lenses 27 with a common optical axis. That is, a plurality of convex lenses 27 are provided on either side of the plate-like lens arrays 21 in a vertical and horizontal matrix with the optical axes of the convex lenses 27 being parallel to each other. Each pair of convex lenses 27 with a common optical axis define the convex lens element 26.

In the lens array unit 12, the two plate-like lens arrays 21 are superposed so that the corresponding two convex lens elements 26 in the two plate-like lens arrays 21 are aligned in the optical axis direction to define a complex lens 28.

The lens array unit 12 thus configured is arranged in front of the display unit 11, to allow the image display plane 15a to be located within an effective operating distance of each complex lens 28. Hence, a real image 2 in focus is formed in the front space 3 (on an image formation plane 4 formed with the lens array unit 12).

Although the real image 2 formed with the lens array unit 12 is actually a plane image, a viewer views that the real image 2 as it floats in the air, and thus, the viewer can feel the real image 2 as a three-dimensional image. In addition, the two-dimensional image 1 to be displayed is created with the three-dimensional image expression method by shading, perspectivism, etc., as described in this embodiment. Hence, the viewer can view the formed real image 2 as a further three-dimensional image.

Also, the real image 2 formed by the lens array unit 12 becomes an erect image with 1× magnification of the two-dimensional image 1. In particular, each of the complex lenses 28 of the lens array unit 12 forms, in the front space 3, an image with 1× magnification of a corresponding virtually divided image (an image in an area which is covered by each of the complex lenses 28) contained in the two-dimensional image 1 displayed on the image display plane 15a. Since each of the complex lenses 28 has the two convex lens elements 26, image light from each of the virtually divided images of the two-dimensional image 1 is reversed two times (reversed once at a display-plane-side lens array 21b and reversed again at an image-formation-side lens array 21a), to form the erect image in the front space 3. Accordingly, the entire lens array unit 12 forms a group of erect images with 1× magnification of a plurality of virtually divided images, that is, an erect image with 1× magnification of the two-dimensional image 1 is formed as the real image 2 in the front space 3.

Similarly to the above, each of the complex lenses 28 of the lens array unit 12 forms an image of a corresponding virtually divided image contained in the image of the detected object 5 that has entered the front space 3, on the image display plane 15a as an erect image with 1× magnification. Accordingly, the entire lens array unit 12 forms an erect image with 1× magnification of the detected object 5, on the image display plane 15a. At this time, an image of the detected object 5 located at the image formation plane 4 of the lens array unit 12 is formed on the image display plane 15a in an in-focus state.

Accordingly, the display unit 11 captures the image of the detected object 5 formed on the image display plane 15a (area sensor) with the lens array unit 12. That is, the display unit 11 captures the image of the detected object 5 that has entered the front space 3 through the lens array unit 12, in an in-focus state at the image formation plane 4.

The controller 14 has a CPU that controls the entire processing operation of the controller 14, a hard disk that stores various programs and various data, a logic circuit that assists the function of the CPU and handles an interface signal for peripheral circuits, and the like. In terms of the functions, the controller 14 has an image generating unit 41 that generates the image signal of the two-dimensional image 1 displayed on the display unit 11, a position detecting unit 42 that detects the approach position of the detected object 5, and an integrated control unit 43 that associates these units with each other and controls these units.

The controller 14 reads the stored various programs and data according to demand, outputs the image signal generated by the image generating unit 41 to the display driver 46 on the basis of the read programs and data, and controls the display unit 11. In particular, a control table, in which the detection result of the approach position (described later) is associated with a change in the two-dimensional image 1, is prepared in the controller 14. The image signal is generated on the basis of the control table.

Also, a predetermined image processing calculation is performed for the captured data (captured data of red, blue and green) input by the display unit 11 to generate the captured image in color, similarly to the above description. Then, the approach position of the detected object 5 is detected on the basis of the acquired captured image. That is, the approach position of the detected object 5 at an image pickup plane (image formation plane 4) in the front space 3 is detected on the basis of the position of the detected object in the captured image. Further, an approach position of the detected object 5 in a direction perpendicular to the image pickup plane (depth direction) in the front space 3 may be three-dimensionally detected on the basis of the focus state (edge), size, change in shape, or the like, of the detected object 5 at the captured image.

If other three-dimensionally view method is used that displays a three-dimensional image actually having a depth like the integral photography system (described later), the approach position of the detected object 5 can be accurately and three-dimensionally detected by precisely performing image processing for the captured image without using the focus evaluation factor such as the above-mentioned focus state.

Figure 3:
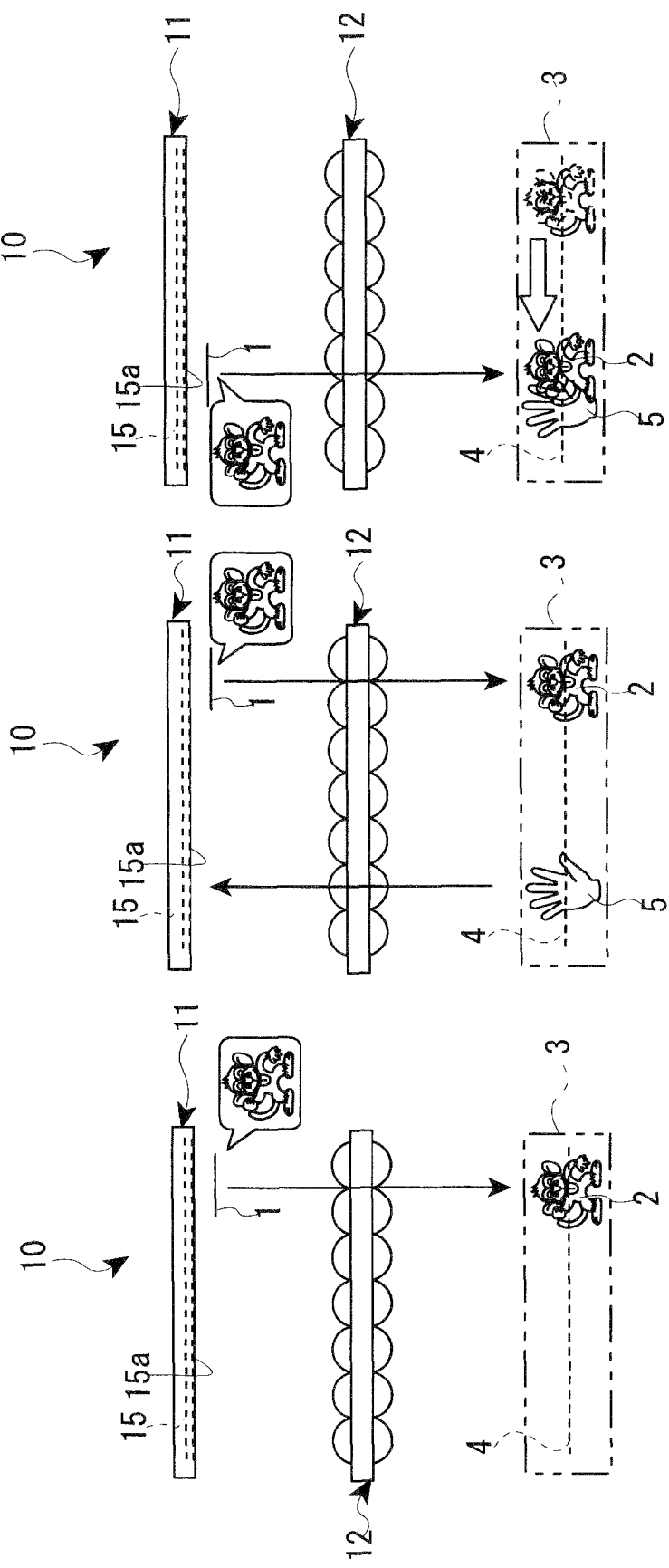
FIGS. 3A-3C are explanatory views showing a user-interactive function in the image display device.

Herein, the user-interactive function in the image display device 10 according to this embodiment is described with reference to FIGS. 3A-3C. First, the display unit 11 displays a two-dimensional image 1 of an object to be three-dimensionally displayed (for example, a monkey character) on the image display plane 15a, and a real image 2 thereof is formed in the front space 3 (refer to part (a) of the same drawing). When a viewer inserts a detected object 5 (for example, hand) to the front space 3, the display unit 11 captures the image of the detected object 5, and detects the approach position thereof (refer to part (b) of the same drawing). Then, on the basis of the above-described control table, the two-dimensional image 1 of the monkey is changed such that the real image 2 (monkey) jumps to and stops at the inserted detected object 5 (hand) (refer to part (c) in the same drawing). Accordingly, the viewer can experience a pleasure that the monkey of the real image 2 stops at the hand when the viewer inserts the hand to the front space 3.

Also, since the display unit 11 (recognizing means) is arranged behind the lens array unit 12, only the real image 2 (monkey) is present between the lens array unit 12 and the viewer. Thus, the viewer does not feel the presence of the mechanism for the position detection, and the entire device can be compact.

After the monkey stops at the hand, the monkey may move corresponding to the motion of the hand. In particular, the moving position of the detected object 5 in the front space 3 is detected, and the display position of the two-dimensional image 1 of the monkey is moved corresponding to the moving position.

Further, in this case, it is desirable to move the monkey in accordance with the motion of the hand in the depth direction. In particular, for example, the lens array unit 12 may be movable to or away from the image display plane 15a so that the image formation position of the real image 2 may be movable in the direction perpendicular to the image formation plane 4 (depth direction). The lens array unit 12 may be moved to or away from the image display plane 15a corresponding to the detection position of the detected object 5 in the depth direction.

Figure 4:
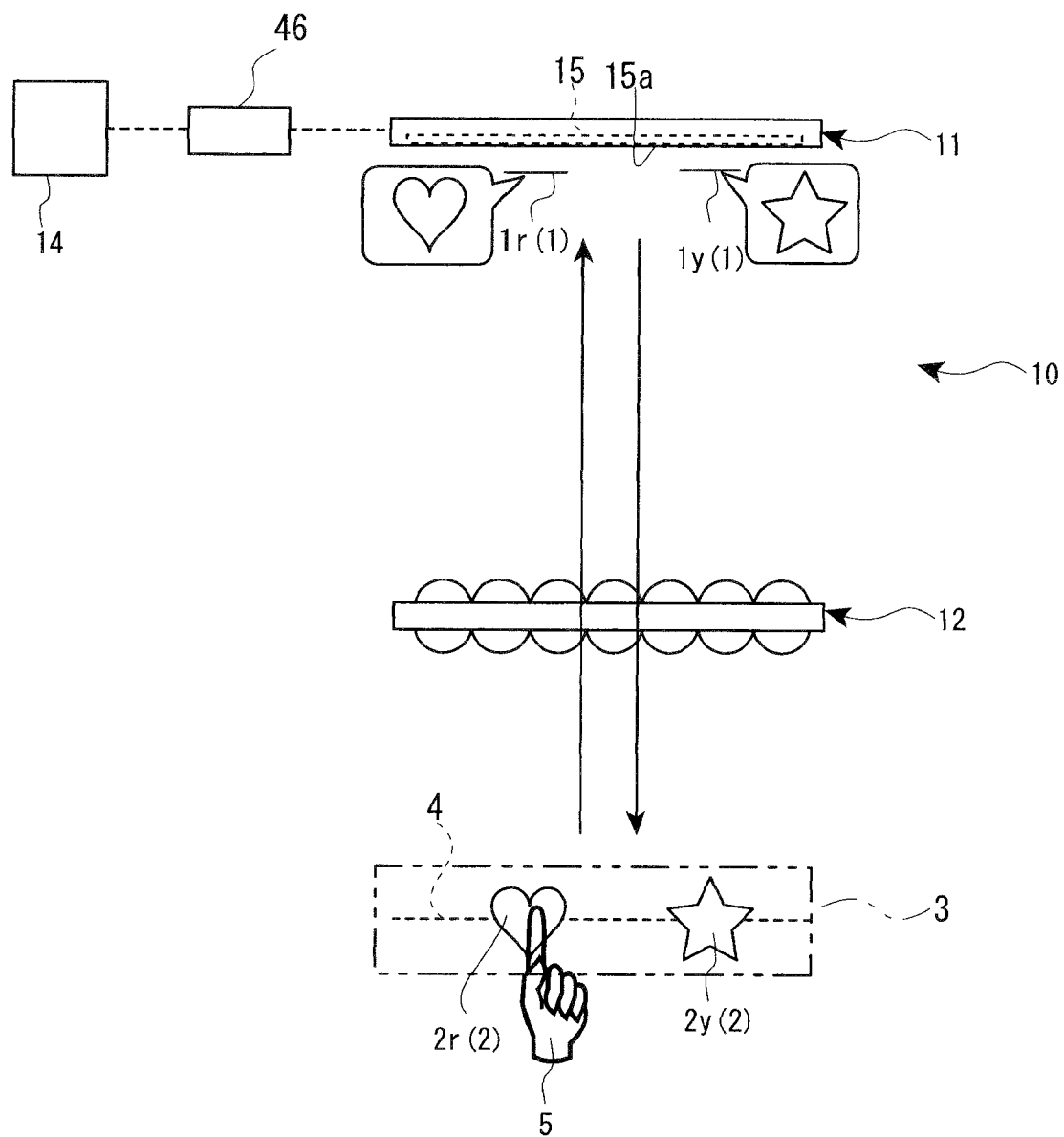
FIG. 4 is a block diagram showing an image display device according to a first modification for the embodiment of the present invention.

Next, a modification of the above-described embodiment is described with reference to FIG. 4. An image display device 10 of a first modification has a substantially similar configuration as that of the above-described image display device 10, but these configurations are different in that, in the first embodiment, the lens array unit 12 captures the image of the detected object 5 formed on the image display plane 15a and the position detection is performed on the basis of the acquired captured image, whereas, in this modification, reflected light of image light of the detected object 5 (finger of the viewer) at the captured image is recognized and the position detection is performed.

The display unit 11 has a similar configuration to the above, however, when the detected object 5 enters the position where the real image 2 is formed in the front space 3, the image light of the two-dimensional image 1 is reflected by the detected object 5. Hence, the detected object 5 as well as the reflected light thereof can be captured (recognized).

Also, the controller 14 has a similar configuration to the above, however, the controller 14 generates the captured image of the detected object 5 using the image light emitted on the basis of the captured data of the detected object 5 and reflected light. Then, the controller 14 detects the approach position of the detected object 5 on the basis of the color of the reflected light in the acquired captured image, and the display position of the two-dimensional image 1.

In particular, when a yellow two-dimensional image 1y (star mark) is displayed on the right side of the image display plane 15a, causing a yellow real image 2y to be formed at the right side of the front space 3, and when a red two-dimensional image 1r (heart mark) is displayed on the left side of the image display plane 15a, causing a red real image 2r to be formed at the left side of the front space 3, if the display unit 11 recognizes that the reflected light is red, the position in the front space 3 corresponding to the display position of the red two-dimensional image 1r (the image formation position of the real image 2r), namely, the left side, is detected as the approach position of the detected object 5. Accordingly, the approach position of the detected object 5 can be detected in association with the color of the two-dimensional image 1 in addition to the display position of the two-dimensional image 1, thereby further increasing the accuracy of the position detection. Also, it is possible to give a feeling like operating a switch in the front space 3 to a user.

In such a case, the position in the front space 3 corresponding to the display position of the two-dimensional image 1 may be detected as the approach position of the detected object 5 depending on whether the reflected light is recognized or not, without relying on the recognition of the color of the reflected light. For example, when the two-dimensional image 1 is displayed on the left side of the image display plane 15a, the display unit 11 captures the reflected light if the detected object 5 comes to the position at the left side in the front space 3 having the real image 2 formed therein. In contrast, the display unit 11 does not capture the reflected light even if the detected object 5 comes to the position at the right half portion of the front space 3. Accordingly, when the reflected light of the image light of the two-dimensional image 1 is captured, the position in the front space 3 corresponding to the display position of the two-dimensional image 1 can be detected as the approach position of the detected object 5. As described above, the approach position of the detected object 5 can be detected in association with the display position of the two-dimensional image 1, thereby increasing the accuracy of the position detection.

In the embodiment, a simple optical sensor that detects the presence of the reflected light or the color of the reflected light may be used instead of the display unit 11 (area sensor). With this configuration, the reflected light (or the color thereof) is detected if the detected object 5 has entered the front space 3 in which the real image 2 is displayed, however, the reflected light (or the color thereof) is not detected (the reflected light is not even generated) if the detected object 5 has entered the front space 3 in which no real image 2 is displayed. Hence, it can be determined whether or not the position of the detected object 5 corresponds to the position of the real image 2, merely with the presence of the reflected light or the color of the reflected light. In this case, since the image processing is not necessary for the captured image, the device can be simplified and the cost can be decreased.

Figure 5:
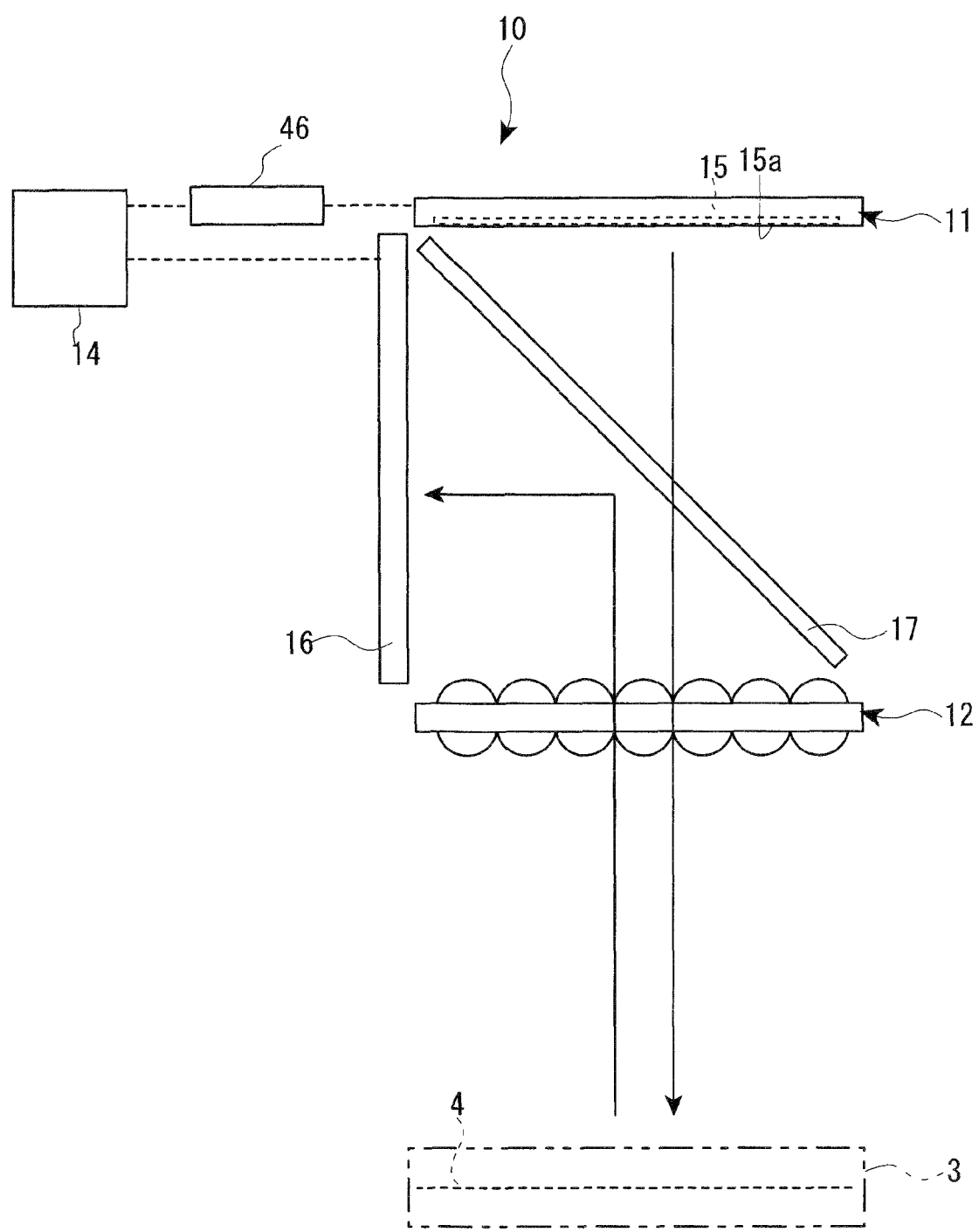
FIG. 5 is a block diagram showing an image display device according to a second modification for the embodiment of the present invention.

Next, a modification of the above-described embodiment is described. As shown in FIG. 5, an image display device 10 of a second modification has a substantially similar configuration to that of the above-described image display device 10, however, these configurations are different in that this modification has a display unit 11 with a display function, and an area sensor 16 with an image acquiring function, whereas the input display with the display function and the image acquiring function recognizes the detected object 5 in the first embodiment.

In addition to the above units, the image display device 10 of this modification includes an area sensor 16 arranged between the image display plane 15a and the lens array unit 12, at a position offset from the image display plane 15a, and a half mirror 17 arranged between the image display plane 15a and the lens array unit 12. In this case, the display unit 11 may have only the display function.

The area sensor 16 has image pickup devices (CCDs or the like) arranged in a matrix. The area sensor 16 performs image capturing in a manner similar to the display unit 11 of the above-described embodiment. Here, the area sensor 16 has a size substantially similar to that of the image display plane 15a of the display 15.

Also, the area sensor 16 is arranged substantially perpendicular to the image display plane 15a and to the lens array unit 12, so that the image of the detected object 5 that has entered the front space 3 is formed at the area sensor 16 through the lens array unit 12 and the half mirror 17. The area sensor 16 captures the formed image of the detected object 5, and outputs the captured data to the controller 14.

As described above, since the area sensor 16 is arranged at the position offset from the image display plane 15a, the area sensor 16, as recognizing means of the detected object 5, can recognize the detected object 5 even if the above-described display unit 11 (input display) cannot be used. Accordingly, the recognizing means can be desirably selected.

Figure 6:
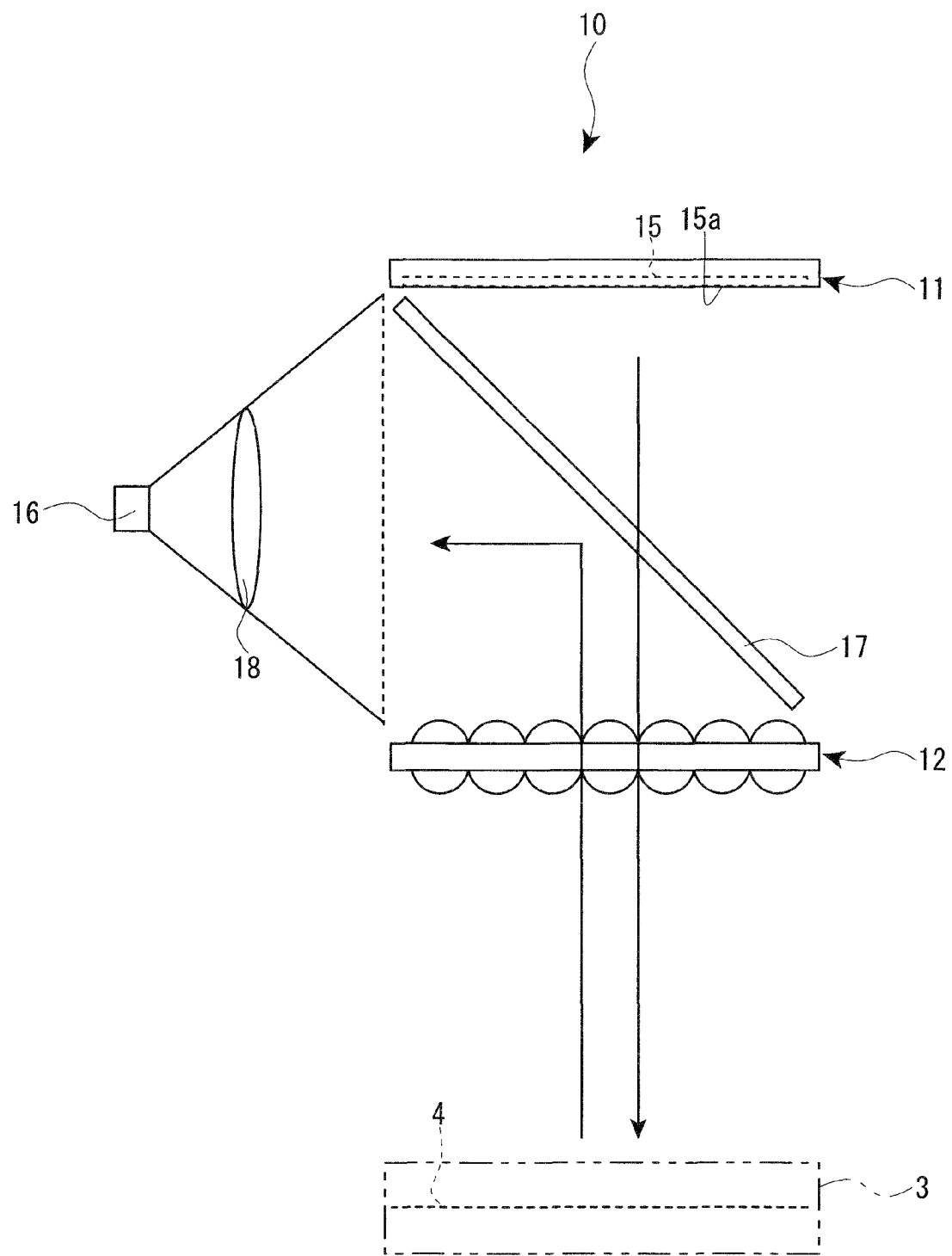
FIG. 6 is a block diagram showing an image display device further including a collective lens according to the above-described second modification.

Also, as shown in FIG. 6, a collective lens 18 may be arranged between the half mirror 17 and the area sensor 16. With this configuration, the light from the lens array unit 12 is collected and an image with the light is formed at the area sensor 16. Accordingly, the size of the area sensor 16 can be decreased, and the area sensor 16 can be desirably selected, as well as the layout design can be desirably determined.

Figure 7:
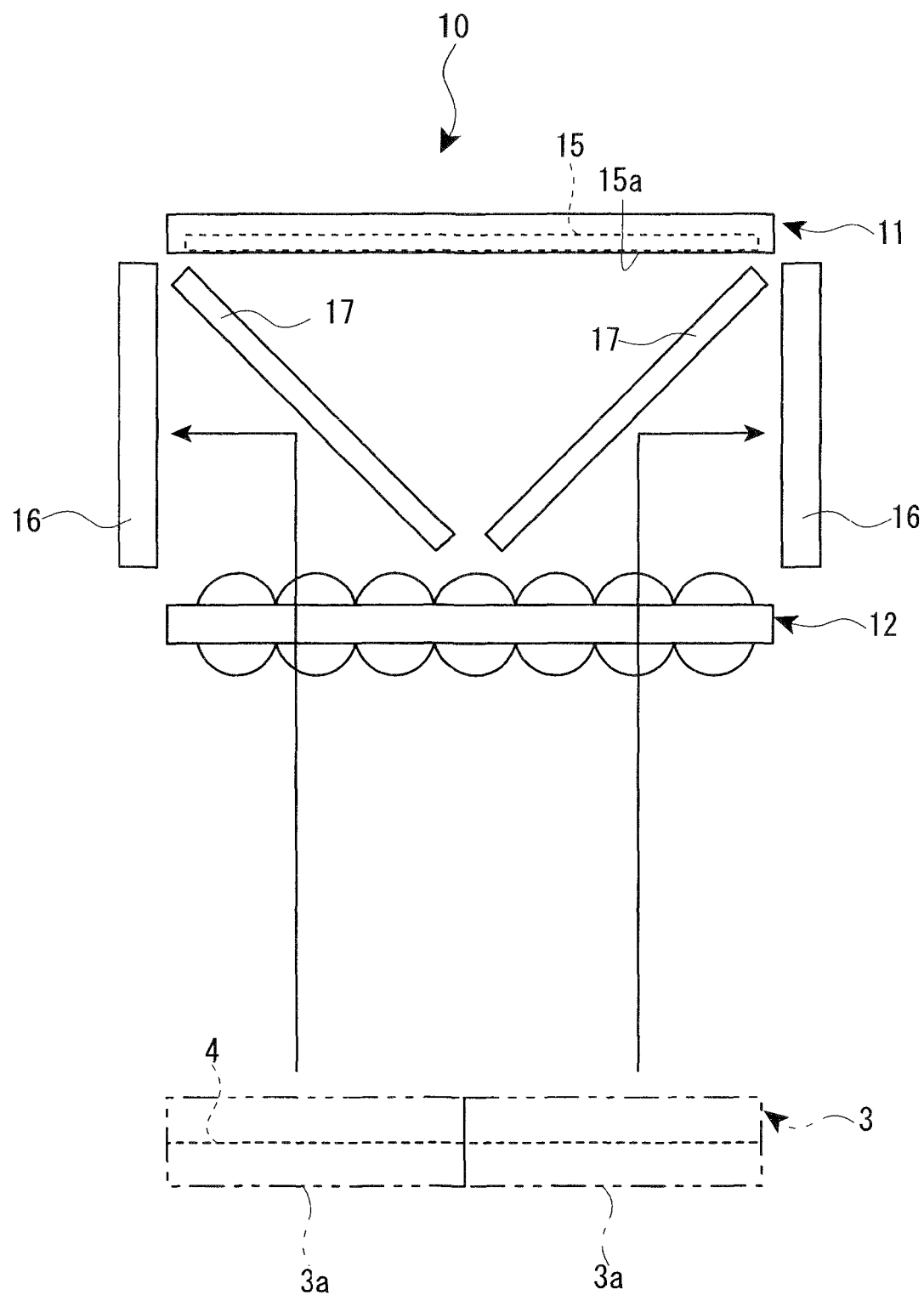
FIG. 7 is a block diagram showing an image display device including a plurality of area sensors according to the above-described second modification.

Further, as shown in FIG. 7, a configuration may have two area sensors 16 arranged at positions offset from the image display plane 15a of the display 15 on both left and right sides (or upper and lower sides) thereof at about 90 degrees to the image display plane 15a and the lens array unit 12, and two half mirrors 17 located between the image display plane 15a and the lens array unit 12 at about 45 degrees to the image display plane 15a and to the lens array unit 12, the half mirrors 17 being perpendicular to each other (to form substantially a "V" shape). That is, the two half mirrors 17 respectively correspond to two virtually divided front spaces 3a formed such that the front space 3 is vertically divided into two with respect to the image display plane 15a, and the two area sensors 16 respectively correspond to the two virtually divided front spaces 3a.

With this configuration, since the area sensors 16 and the half mirrors 17 are provided corresponding to the virtually divided front spaces 3a with the above arrangement, the two area sensors 16 can be arranged at the positions offset from the image display plane 15a, and the half mirrors 17 can be downsized. The configuration can be used when the installation space between the image display plane 15a and the lens array unit 12 (the operating distance of each complex lenses 28) is small, or when the depth of the image display device 10 is desired to be small. In addition, the area of each area sensor 16 may correspond to each virtually divided front space 3a, and hence, the area sensor 16 can be downsized.

Figure 8:
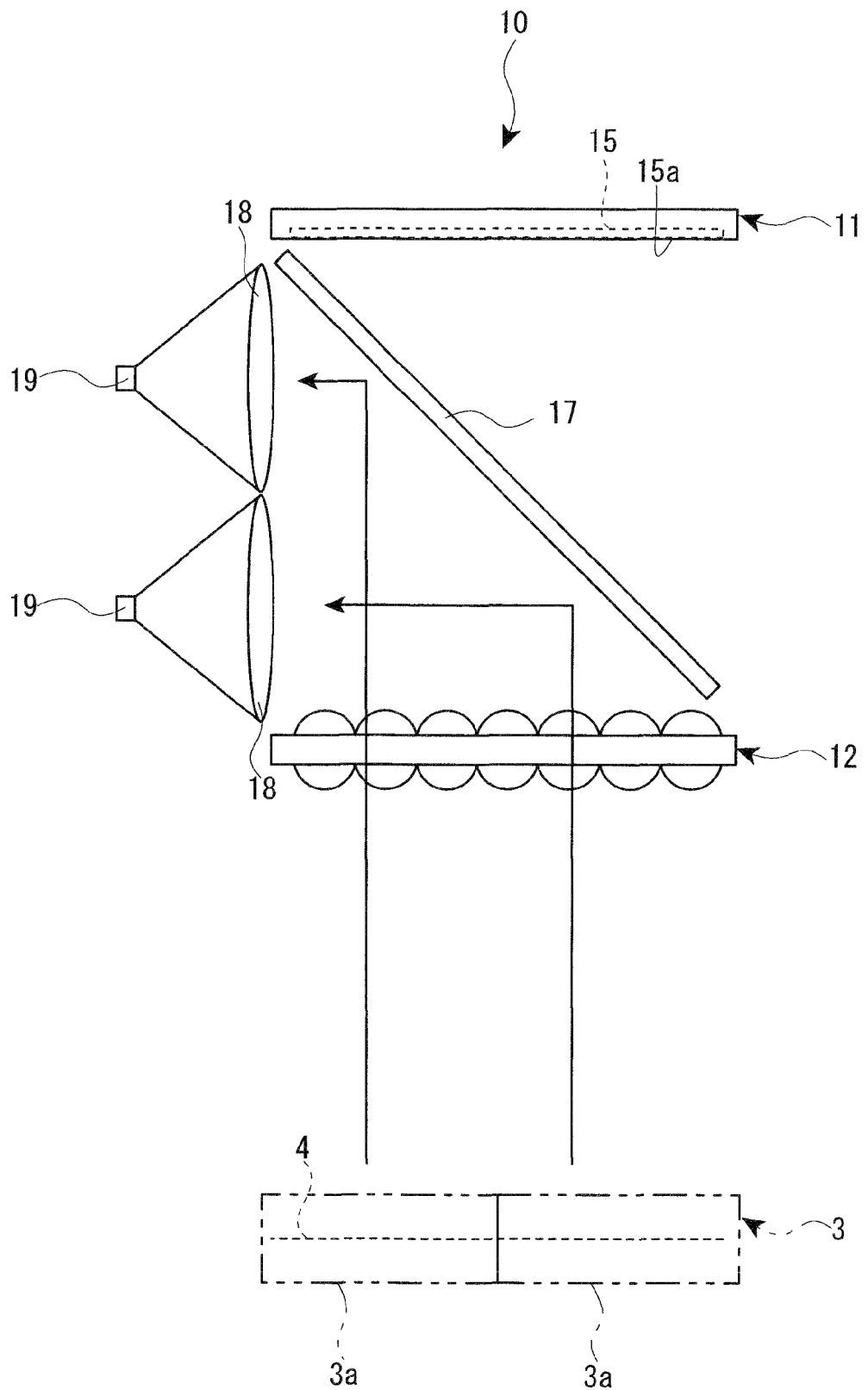
FIG. 8 is a block diagram showing an image display device with the present invention applied, the device using optical sensors.

While the area sensor 16 (display unit 11) is used as the recognizing means of the detected object 5, a simple optical sensor 19 may be used instead of such an area sensor to decrease the cost, if the position detection does not have to be accurate (refer to FIG. 8). In this case, a plurality of optical sensors 19 are provided corresponding to a plurality of virtually divided front spaces 3a, so as to detect the virtually divided front space 3a that the detected object 5 has entered. Hence, an approximate approach position can be detected. While the front space 3 is vertically divided into two, the number of division may be arbitrary determined. For example, the front space 3 may be divided into nine (vertical three×horizontal three), and nine optical sensors 19 may be provided corresponding thereto.

Further, if the optical sensor 19 is configured to detect reflected light (or the color thereof) as described above, the optical sensor 19 can detect the approach position of the detected object 5 in association with the position of the real image 2 (display position of the two-dimensional image 1).

As described above, with the image display device 10 with the present invention applied, the approach position of the detected object 5 that has entered the front space 3 having the real image 2 formed therein can be detected with the compact configuration, without the viewer feeling the presence of the mechanism for the position detection.

Figure 9:
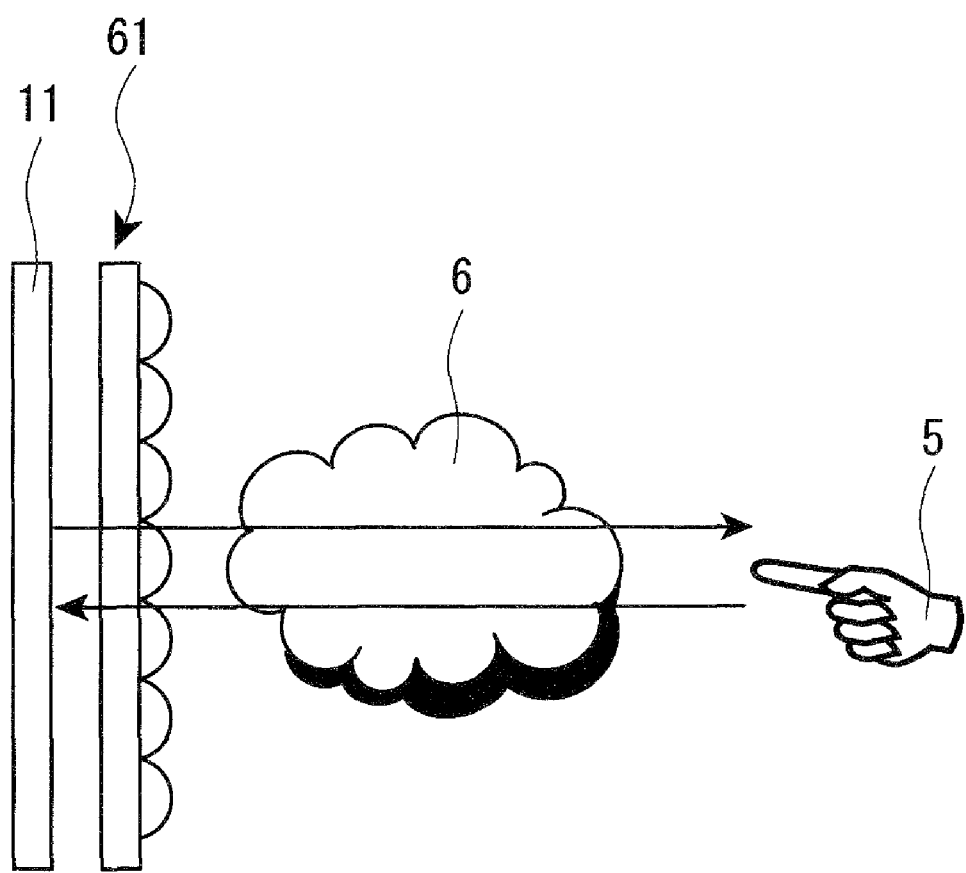
FIG. 9 is a block diagram showing an image display device with the present invention applied, the device using an optical panel of integral photography system.

In the above-described embodiment, while the system that the lens array unit 12 forms the real image 2 of the two-dimensional image 1 in the front space 3 is explained as the three-dimensional image display system, other system may be employed. For example, a system that a virtual image is three-dimensionally viewed using binocular parallax, such as a parallax barrier system, or a lenticular system, may be employed. However, the system that allows the real image to be three-dimensionally viewed, such as the above-mentioned embodiment, or the integral photography system (described later) is desirable. Thus, the viewer can feel as if the viewer actually touches the real image, thereby enhancing the presence of the image. In particular, as shown in FIG. 9, with the use of an IP lens array 61 of the integral photography system, a three-dimensional image (cloud in the drawing) actually having a depth as a real image 6 is formed unlike the above-described lens array unit 12. Hence, the presence of the image can be further enhanced. Further, in this case, the display unit 11 is preferably the input display.

Also, the optical panel that allows the two-dimensional image 1 to be three-dimensionally viewed may be a lenticular lens, a barrier, a slit, a pinhole array, or the like, instead of the lens array unit 12 or the IP lens array 61, depending on the three-dimensional image display system.

Further, in the embodiment with the lens array unit 12, since the erect image with 1× magnification of the detected object 5 is formed on the image display plane 15a (area sensor 16) as described above, the image processing does not become complicated as compared with the other system. In contrast, in the embodiment with the integral photography system, or in a three-dimensional image display system other than the embodiment, the image of the detected object 5 cannot be recognized with its original shape because of the structure of the optical panel that provides a three-dimensional view. Thus, the image processing may become complicated. Still, by performing the complicated image processing as described above, three-dimensional detection can be performed.

If the above embodiments are combined, or one of them is properly selected, further sophisticated position detection, or further accurate position detection may be performed. Or, the device can be simplified, downsized, and reduced in costs. A various type of position detection can be provided as necessary.

The invention claimed is:

1. An image display device comprising:
   a displaying element configured to display a two-dimensional image;
   an optical panel arranged in front of an image display plane of the displaying element, and configured to form a three-dimensionally viewable image in a front space of the optical panel on the basis of the two-dimensional image;
   a recognizing element arranged behind the optical panel, and configured to optically recognize a detected object that has entered the front space, through the optical panel; and
   a position detecting element configured to detect an approach position of the detected object in the front space on the basis of a recognition result of the recognizing element,
   the image display device characterized in that the recognizing element includes an area sensor which captures an image in the front space through the optical panel; and the position detecting element detects the approach position of the detected object on the basis of a captured image acquired into the area sensor,
   wherein the recognizing element recognizes reflected light that image light of the two-dimensional image is reflected by the detected object, and
   wherein the position detecting element detects the approach position of the detected object on the basis of the reflected light and a display position of the two-dimensional image.

2. The image display device according to claim 1,
   wherein the displaying element is configured to display a plurality of the two-dimensional images with different colors,
   wherein the recognizing element is configured to recognize the color of the reflected light, and
   wherein the position detecting element detects the approach position of the detected object on the basis of the color of the reflected light and the display position of the two-dimensional image.

3. The image display device according to claim 1, wherein the displaying element contains the area sensor.

4. The image display device according to claim 1, wherein the position detecting element detects a three-dimensional approach position of the detected object on the basis of a position of the detected object in the captured image, and a focus evaluation factor of the detected object at the captured image.

5. The image display device according to claim 1,
   wherein the recognizing element is arranged at a position offset from the image display plane, and
   wherein the device further comprises a light guiding element arranged between the image display plane and the optical panel, configured to guide light from the image display plane to the optical panel, and to guide light from the optical panel to the recognizing element.

6. The image display device according to claim 1, wherein a plurality of the recognizing element are provided corresponding to a plurality of virtually divided front spaces that the front space is vertically and/or horizontally divided with respect to the image display plane.

7. The image display device according to claim 1, further comprising a collective element configured to collect light from the optical panel to the recognizing element.

8. The image display device according to claim 1, further comprising an image control unit controlling the two-dimensional image on the basis of a control table, in which the detection result of the position detecting element is associated with a change in the two-dimensional image displayed on the image display plane.

9. The image display device according to claim 1,
wherein the optical panel is constituted by a convex lens array, and
wherein the three-dimensionally viewable image is a real image of the two-dimensional image that is formed in the front space with the convex lens array.

10. An image display device comprising:
a displaying element configured to display a two-dimensional image;
an optical panel arranged in front of an image display plane of the displaying element configured to form, a three-dimensionally viewable image in a front space of the optical panel on the basis of the two-dimensional image;
a recognizing element configured to recognize reflected light that image light of the two-dimensional image is reflected by a detected object that has entered the front space; and
a position detecting element configured to detect an approach position of the detected object in the front space, on the basis of a recognition result of the recognizing element,
wherein the recognizing element is an area sensor capturing an image in the front space through the optical panel, and
wherein the position detecting element detects the approach position of the detected object on the basis of a captured image acquired into the area sensor.

11. The image display device according to claim 10,
wherein the recognizing element recognizes reflected light that image light of the two-dimensional image is reflected by the detected object, and
wherein the position detecting element detects the approach position of the detected object on the basis of the reflected light and a display position of the two-dimensional image.

12. The image display device according to claim 10, wherein the displaying element contains the area sensor.

13. The image display device according to claim 10, wherein the position detecting element detects a three-dimensional approach position of the detected object on the basis of a position of the detected object in the captured image, and a focus evaluation factor of the detected object at the captured image.

14. The image display device according to claim 10,
wherein the recognizing element is arranged at a position offset from the image display plane, and
wherein the device further comprises light guiding element arranged between the image display plane and the optical panel, configured to guide light from the image display plane to the optical panel, and to guide light from the optical panel to the recognizing element.

15. The image display device according to claim 10, wherein a plurality of the recognizing element are provided corresponding to a plurality of virtually divided front spaces that the front space is vertically and/or horizontally divided with respect to the image display plane.

16. The image display device according to claim 10, further comprising collective element configured to collect light from the optical panel to the recognizing element.

17. The image display device according to claim 10, further comprising an image control unit configured to control the two-dimensional image on the basis of a control table, in which the detection result of the position detecting element is associated with a change in the two-dimensional image displayed on the image display plane.

18. The image display device according to claim 10,
wherein the optical panel is constituted by a convex lens array, and
wherein the three-dimensionally viewable image is a real image of the two-dimensional image that is formed in the front space with the convex lens array.

* * * * *